United States Patent
Levering et al.

(10) Patent No.: US 7,543,001 B2
(45) Date of Patent: Jun. 2, 2009

(54) STORING OBJECT RECOVERY INFORMATION WITHIN THE OBJECT

(75) Inventors: Margaret Ellen Levering, Rochester, MN (US); Chad Allen Olstad, Rochester, MN (US); David Finian Owen, Rochester, MN (US); Larry William Youngren, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 742 days.

(21) Appl. No.: 10/870,377

(22) Filed: Jun. 17, 2004

(65) Prior Publication Data

US 2005/0283665 A1 Dec. 22, 2005

(51) Int. Cl.
G06F 12/00 (2006.01)
G06F 17/30 (2006.01)
G06F 15/16 (2006.01)

(52) U.S. Cl. ........................ 707/202; 707/201
(58) Field of Classification Search ......... 707/201–202, 707/3–5; 714/1, 15, 20; 715/229
See application file for complete search history.

(56) References Cited

U.S. PATENT DOCUMENTS

| | | | | |
|---|---|---|---|---|
| 4,751,702 A * | 6/1988 | Beier et al. | ...... | 714/13 |
| 5,155,678 A * | 10/1992 | Fukumoto et al. | ...... | 707/202 |
| 5,247,672 A * | 9/1993 | Mohan | ...... | 711/152 |
| 6,192,365 B1 * | 2/2001 | Draper et al. | ...... | 707/101 |
| 6,351,754 B1 * | 2/2002 | Bridge et al. | ...... | 707/202 |
| 6,353,834 B1 * | 3/2002 | Wong et al. | ...... | 707/202 |
| 6,567,928 B1 * | 5/2003 | Lyle et al. | ...... | 714/15 |
| 6,678,704 B1 * | 1/2004 | Bridge et al. | ...... | 707/202 |
| 6,751,674 B1 * | 6/2004 | Satagopan et al. | ...... | 709/249 |
| 6,802,025 B1 * | 10/2004 | Thomas et al. | ...... | 714/15 |
| 6,978,279 B1 * | 12/2005 | Lomet et al. | ...... | 707/202 |
| 7,065,540 B2 * | 6/2006 | Chandrasekaran et al. | ...... | 707/203 |
| 7,200,623 B2 * | 4/2007 | Chandrasekaran et al. | ...... | 707/203 |
| 7,234,076 B2 * | 6/2007 | Daynes et al. | ...... | 714/15 |
| 7,237,147 B2 * | 6/2007 | Ganesh et al. | ...... | 714/16 |
| 2005/0097149 A1 * | 5/2005 | Vaitzblit et al. | ...... | 707/202 |
| 2007/0156777 A1 * | 7/2007 | Wolff et al. | ...... | 707/201 |

* cited by examiner

*Primary Examiner*—Tony Mahmoudi
*Assistant Examiner*—Cecile Vo
(74) *Attorney, Agent, or Firm*—Owen J. Gamon

(57) ABSTRACT

A method, apparatus, system, and signal-bearing medium that in an embodiment determine, after a restore of a version of an object, where to begin applying changes from a change log to the object based on an identification in the saved version of the object. When a save command for an object is received, an identification of the change log entry associated with the save command is stored in the saved version of the object. Changes to the object then continue to be logged to the change log. After the saved version of the object is restored, the identification in the saved version of the object is used to find the change log entry at which to start applying changes from the change log to the object. In this way, the point in the change log at which to start applying changes to the object may be determined based on the saved version of the object. In an embodiment, this allows the object to continue to be accessed while the save operation is performed. Further, this prevents confusion as to which starting point in the change log to use when multiple save operations have been performed.

6 Claims, 4 Drawing Sheets

CHANGE LOG — 150

| SEQUENCE NUMBER (240) | RECORD IDENTIFIER (245) | OPERATION (250) | DATA (255) | |
|---|---|---|---|---|
| 0020 | 0504 | PUT | FRED | 205 |
| 0021 | 6012 | UPDATE | JANE | 210 |
| 0022 | FILE | START SAVE | | 215 |
| 0023 | 8842 | READ | | 220 |
| 0024 | 9123 | UPDATE | $12.52 | 225 |
| 0025 | FILE | MEMBER SAVED | | 230 |
| 0026 | 8892 | PUT | 55901 | 235 |

STORING OBJECT RECOVERY INFORMATION WITHIN THE OBJECT

FIELD

An embodiment of the invention generally relates to computers. In particular, an embodiment of the invention generally relates to storing object recovery information within the object itself.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware (such as semiconductors, integrated circuits, programmable logic devices, programmable gate arrays, and circuit boards) and software, also known as computer programs.

A digital storage device in a computer system stores the operating system software, user applications, and data files. One function of the operating system is to administer data storage in the storage device. A sub-system of the operating system, namely the file system, administers data storage in the storage device by allocating data to files, directories, or folders in response to appropriate requests by a system user or by an application.

Over time, files and directories are modified in different manners. For example, directories are created and named. Also, files are generated and deleted and the data in a file or in one of its attributes is modified. Further, a link from a file or a directory to an existing directory or file may be added. To maintain a history of what activity has taken place within a digital storage device, a sub-system of the file system, namely the journal file system, keeps a current record, or journal, of directories and their contents.

A journal file system is a system in which the digital storage device maintains data integrity in the event of an operating system crash, a power failure, or if the operating system is otherwise halted abnormally. The journal file system maintains a journal (also known as a journal receiver or change log) of what activity has taken place within the data area of the digital storage device, and if a system crash occurs, any lost data can be reconstructed from the information contained in the journal receiver.

A journal file system provides a facility to track detailed information about file system object changes and provides protection against partial changes being made to an object at the point of an abnormal system termination. An object, as used herein, is a named storage space in a file system, which consists of a set of characteristics that describe itself and in some cases data. Some examples of objects are directories, programs, files, libraries, folders, databases, and tables.

In general, a journal file system provides three primary areas of support when an object is journaled. These areas of support are: (i) recording changes to objects, (ii) single system recovery, and (iii) recovery of a saved object to a known state. These areas are discussed below.

In a recording of changes to objects, object changes are recorded as journal entries in a journal receiver. The journal receiver is a file object that contains journal entries added by the journal system when objects are modified. As an example, directories are created and renamed or files are created and the data in a file or in one of its attributes has been modified. The journal entries may then be used for recovery from an abnormal system termination. Another use for the recorded changes is for replicating entries from the journal receiver to a back-up system so that they can be retrieved to create and maintain a replica of the source file system.

Single system recovery occurs during an initial program load (IPL) following an abnormal system termination. The journal receiver serves as a basis for all changes to objects that are implemented by an IPL. The IPL then processes object changes as if the abnormal system termination had not occurred by using the data contained in the journal receiver log that was created before the system termination. Damaged objects, caused by system functions that were interrupted during their critical operations, are discarded.

Recovery of a saved object to a known state is typically either a system administrator-initiated or a user-initiated recovery that provides a mechanism to recover a saved object to a specific state. The object is recovered to a state of its last saved operation occurring sometime prior to the operation that caused the object to become corrupted. Then, objects are recovered to some later point in time by applying the journaled changes that were recorded in the journal receiver. The problem lies in attempting to determine the point in the journal receiver from which to start applying the changes.

One current technique for attempting to address this problem is to scan the journal receiver data backwards to find the record of the last save for each object. A different starting spot may be needed for each object. Unfortunately, this backwards scanning technique can be very time consuming. Also, if the user does not have the media with the last save (most recent) available, but instead restores some previous (earlier) version of the object, then the last save point in the journal receiver is not the correct point at which to start applying the changes, which can lead to incorrect or unpredictable results.

Another current technique is to quiesce the system relative to the object before performing the save, in order to ensure that no objects are changing. This allows the apply for all objects to be started at the same date/time (the start of the save), or at one given journal entry (the entry that records the first object being saved). Unfortunately, this technique is very disruptive to the end users of the system because of the quiesce every time a save is desired.

Thus, without a better way to determine the point in the journal receiver from which to start applying changes, users will continue to suffer from disruption, lost time, and unpredictable results.

SUMMARY

A method, apparatus, system, and signal-bearing medium are provided that in an embodiment determine, after a restore of a version of an object, where to begin applying changes from a change log to the object based on an identification in the saved version of the object. When a save command for an object is received, an identification of the change log entry associated with the save command is stored in the saved version of the object. Changes to the object then continue to be logged to the change log. After the saved version of the object is restored, the identification in the saved version of the object is used to find the change log entry at which to start applying changes from the change log to the object. In this way, the point in the change log at which to start applying changes to the object may be determined based on the saved version of the object. In an embodiment, this allows the object to continue to be accessed while the save operation is performed. Further, this prevents confusion as to which starting point in the change log to use when multiple save operations have been performed.

DETAILED DESCRIPTION

Figure 1:
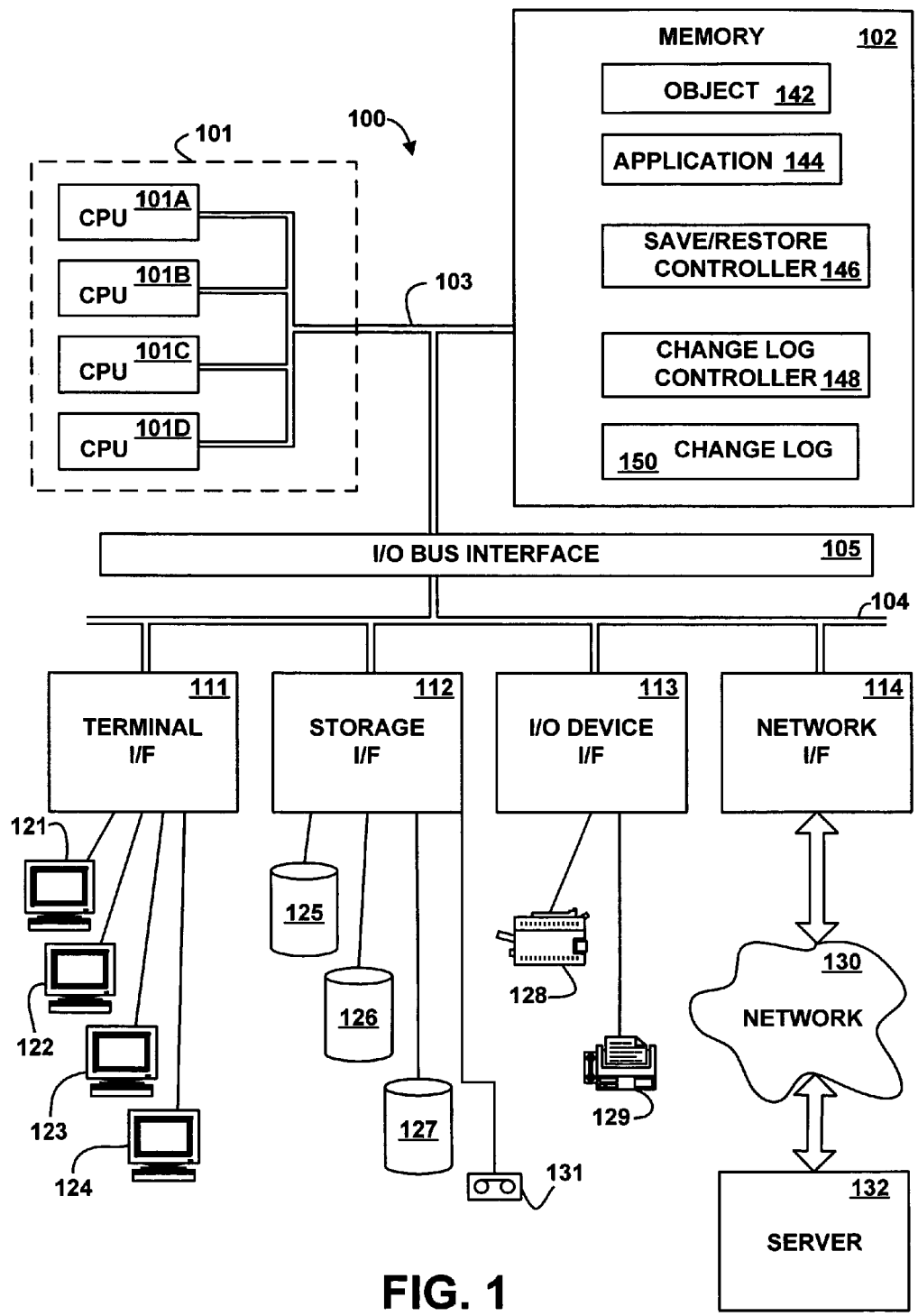
FIG. 1 depicts a block diagram of an example system for implementing an embodiment of the invention.

Referring to the Drawing, wherein like numbers denote like parts throughout the several views, FIG. 1 depicts a high-level block diagram representation of a computer system 100 connected to a server 132 via a network 130, according to an embodiment of the present invention. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The memory 102 includes an object 142, an application 144, a save/restore controller 146, a change log controller 148, and a change log 150. Although the object 142, the application 144, the save/restore controller 146, the change log controller 148, and the change log 150 are illustrated as being contained within the memory 102 in the computer system 100, in other embodiments some or all of them may be on different computer systems, such as the server 132, and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the object 142, the application 144, the save/restore controller 146, the change log controller 148, and the change log 150 are illustrated as residing in the memory 102, these elements are not necessarily all completely contained in the same storage device at the same time.

The object 142 may include any data that is capable of being changed, saved, and restored. In various embodiments, the object 142 may be a file, program, method, application, directory, container, database, document, table, registry, web page, schema, framework, any portion thereof, or any other appropriate type of data. The object 142 is further described below with reference to FIG. 2B.

The application 144 makes additions, updates, and/or deletions (referred to herein collectively as changes) to the object 142. In various embodiments, the application 144 may be a database management system, an editor, an online order management system, an accounting system, or any other appropriate type of application.

The save/restore controller 146 saves and restores the object 142 or any portion thereof to secondary storage, such as the tape drive 131 or any other appropriate type of storage device. The change log controller 148 saves a log of changes that the application 144 makes to the object 142 in the change log 150. The change log controller 148 also may apply the changes from the change log 150 back to the object 142, for example after a restore of the object 142. The change log 150 is further described below with reference to FIG. 2A.

In an embodiment, the save/restore controller 146 and the change log controller 148 include instructions capable of executing on the processor 101 or statements capable of being interpreted by instructions executing on the processor 101 to perform the functions as further described below with reference to FIGS. 3 and 4. In another embodiment, the save/restore controller 146 and the change log controller 148 may be implemented in microcode. In yet another embodiment, the save/restore controller 146 and the change log controller 148 may be implemented in hardware via logic gates and/or other appropriate hardware techniques, in lieu of or in addition to a processor-based system.

The memory bus 103 provides a data communication path for transferring data among the processors 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interconnect) bus, or any other appropriate bus technology. The I/O interface units support communication with a variety of storage and I/O devices. For example, the terminal interface unit 111 supports the attachment of one or more user terminals 121, 122, 123, and 124.

The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the DASD 125, 126, and 127 may be loaded from and stored to the memory 102 as needed. The storage interface unit 112 may also support other types of devices, such as a tape device 131, an optical device, or any other type of storage device.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

It should be understood that FIG. 1 is intended to depict the representative major components of the computer system 100 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements embodying the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127) or diskette; or (3) information conveyed to the computer system 100 by a communications medium, such as through a computer or a telephone network, e.g., the network 130, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figures 2A, 2B:
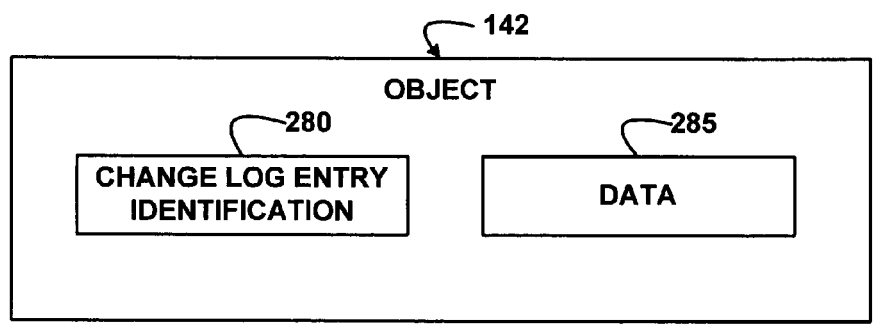
FIG. 2A depicts a block diagram of an example data structure for a change log, according to an embodiment of the invention.
FIG. 2B depicts a block diagram of an example data structure for an object, according to an embodiment of the invention.

FIG. 2A depicts a block diagram of an example data structure for the change log 150, according to an embodiment of the invention. The change log 150 includes example entries 205, 210, 215, 220, 225, 230, and 235, but in other embodiments any number of entries with any appropriate data may be present. Each entry 205, 210, 215, 220, 225, 230, and 235 includes a sequence number field 240, a record identifier field 245, an operation field 250, and a data field 255, but in other embodiments, the entries 205, 210, 215, 220, 225, 230, and 235 may include more or fewer fields.

The sequence number 240 identifies the entry and specifies an order in time that changes to the object 142 were made. The record identifier 245 identifies the record in the object 142 associated with the entry that the application 144 added, updated, or deleted. If the entry is not associated with a record in the object 142 (e.g., entries 215 and 230), the record identifier 245 may specify that the entry is a checkpoint. The operation 250 identifies the operation made by the application 144 to the object 142 or the type of checkpoint. The data 255 includes the data that the application 144 added, updated, or deleted at the record 245 in the object 142. For example, entry 205 indicates that at a time associated with sequence number "0020" the application 144 put (inserted or added) the data "Fred" to record "0504" in the object 142.

Entry 210 indicates that at a time associated with sequence number "0021" the application 144 updated the data "Jane" in record "6012" in the object 142. Entry 215 indicates that at a time associated with sequence number "0022" the save/restore controller 146 began to save the contents of the object 142 to secondary storage, such as the tape 131. Entry 220 indicates that at a time associated with sequence number "0023" the application 144 read the contents of record "8842" from the object 142. Entry 225 indicates that at a time associated with sequence number "0024" the application 144 updated the data "$12.52" in record "9123" in the object 142. Entry 230 indicates that at a time associated with sequence number "0025" the save/restore controller 146 completed the save operation of the contents of the object 142. Entry 235 indicates that at a time associated with sequence number "0026" the application 144 put (inserted or added) the data "55901" to record "8892" in the object 142.

FIG. 2B depicts a block diagram of an example data structure for the object 142, according to an embodiment of the invention. The object 142 includes a change log entry identification field 280 and data 285. The object 142 may also include an unillustrated header and other elements not necessary for an understanding of an embodiment of the invention.

The change log entry identification 280 identifies the entry in the change log 150 at which to start an apply operation following a restore of the object 142, as further described below with reference to FIGS. 3 and 4. In an embodiment, the change log entry identification 280 includes a sequence number of the change log entry, but in other embodiments the change log entry identification 280 may include the change log name, a pointer or any other appropriate identifying information. The data 285 includes the data that the application 144 accesses.

Figure 3:
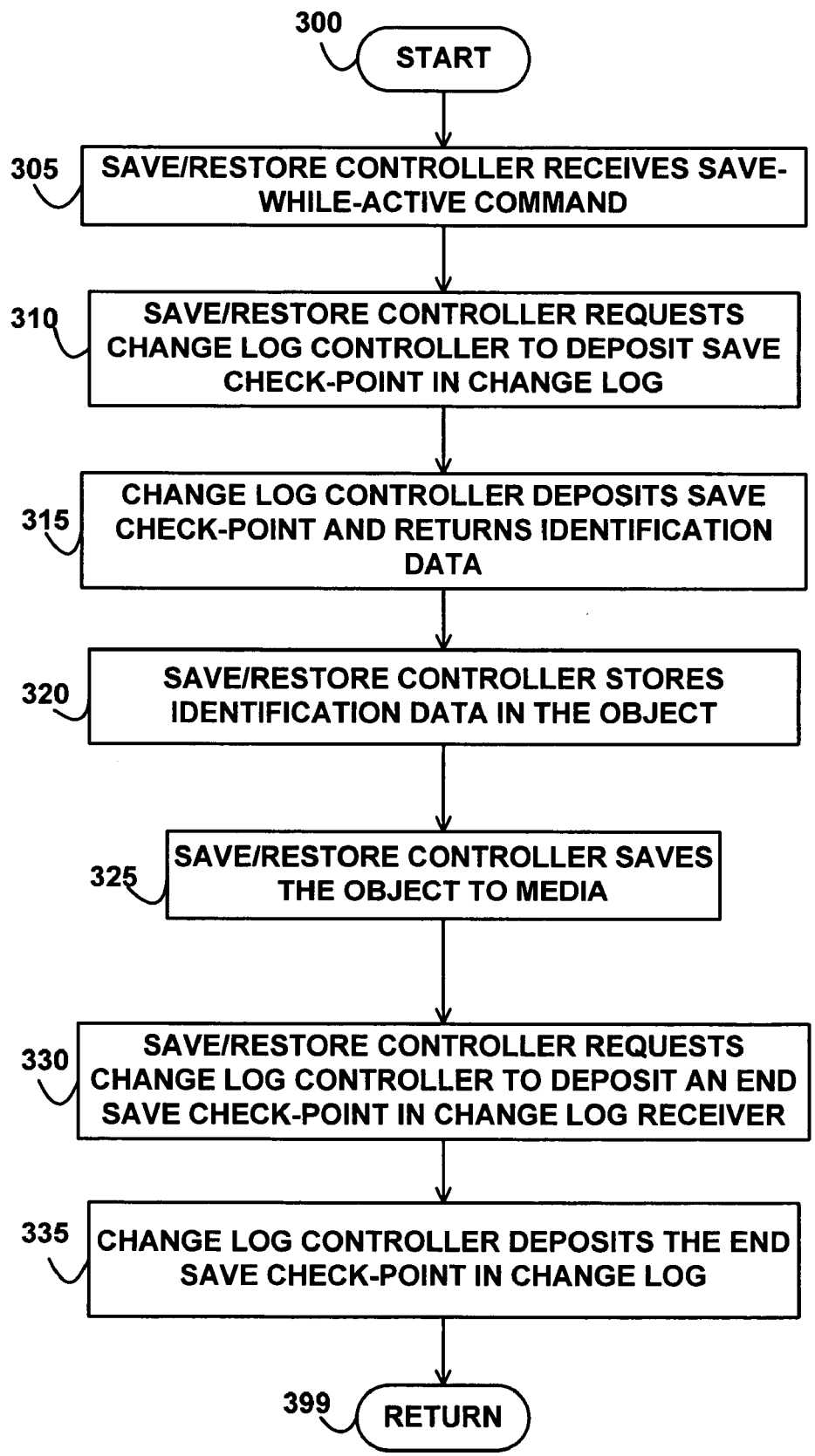
FIG. 3 depicts a flowchart of example processing of a save-while-active command by a save/restore controller, according to an embodiment of the invention.

FIG. 3 depicts a flowchart of example processing of a save-while-active command by the save/restore controller 146 and the change log controller 148, according to an embodiment of the invention. Control begins at block 300. Control then continues to block 305 where the save/restore controller 146 receives a save-while-active command from e.g., a system administrator, a user, or via programmatic control. Save-while-active means that the save/restore controller 146 is to save the object 142 while the application 144 is accessing the object 142 or at least has an open connection to the object 142 even if the application 144 is not currently accessing the object 142. In another embodiment, the save/restore controller 146 receives a save command at block 305, which directs the save/restore controller 146 to save the object 142 while the application 144 is not accessing the object 142.

Control then continues to block 310 where the save/restore controller 146 requests the change log controller 148 to deposit a save check-point in the change log 150. An example of a save check-point is illustrated in FIG. 2A as entry 215, as previously described above.

Control then continues to block 315 where the change log controller 148 deposits the save check-point in the change log 150 and returns identification data identifying the entry of the saved check-point (e.g., the entry 215) in the change log 150 to the save/restore controller 146. Control then continues to block 320 where the save/restore controller 146 stores the identification data in the object 142 as the change log entry identification 280. In another embodiment, the save/restore controller 146 saves the identification data to media associated with the object, such as a tape in the tape drive 131, or other appropriate non-volatile storage, and the identification data is not stored in the object 142 until the object 142 is later restored from the media.

Control then continues to block 325 where the save/restore controller 146 saves the object 142 to media, such as a tape in the tape drive 131, or any other appropriate non-volatile storage. While the object 142 is being saved (and thereafter) the application 144 may continue to make changes to the object 142, which the change log controller 148 logs to the change log 150, for example as entries 220, 225, and 235.

Control then continues to block 330 where the save/restore controller 146 requests the change log controller 148 to deposit an end save check-point (e.g., the entry 230) in the change log 150. Control then continues to block 335 where the change log controller 148 deposits the end save check-point in the change log 150. Control then continues to block 399 where the logic of FIG. 3 returns.

Figure 4:
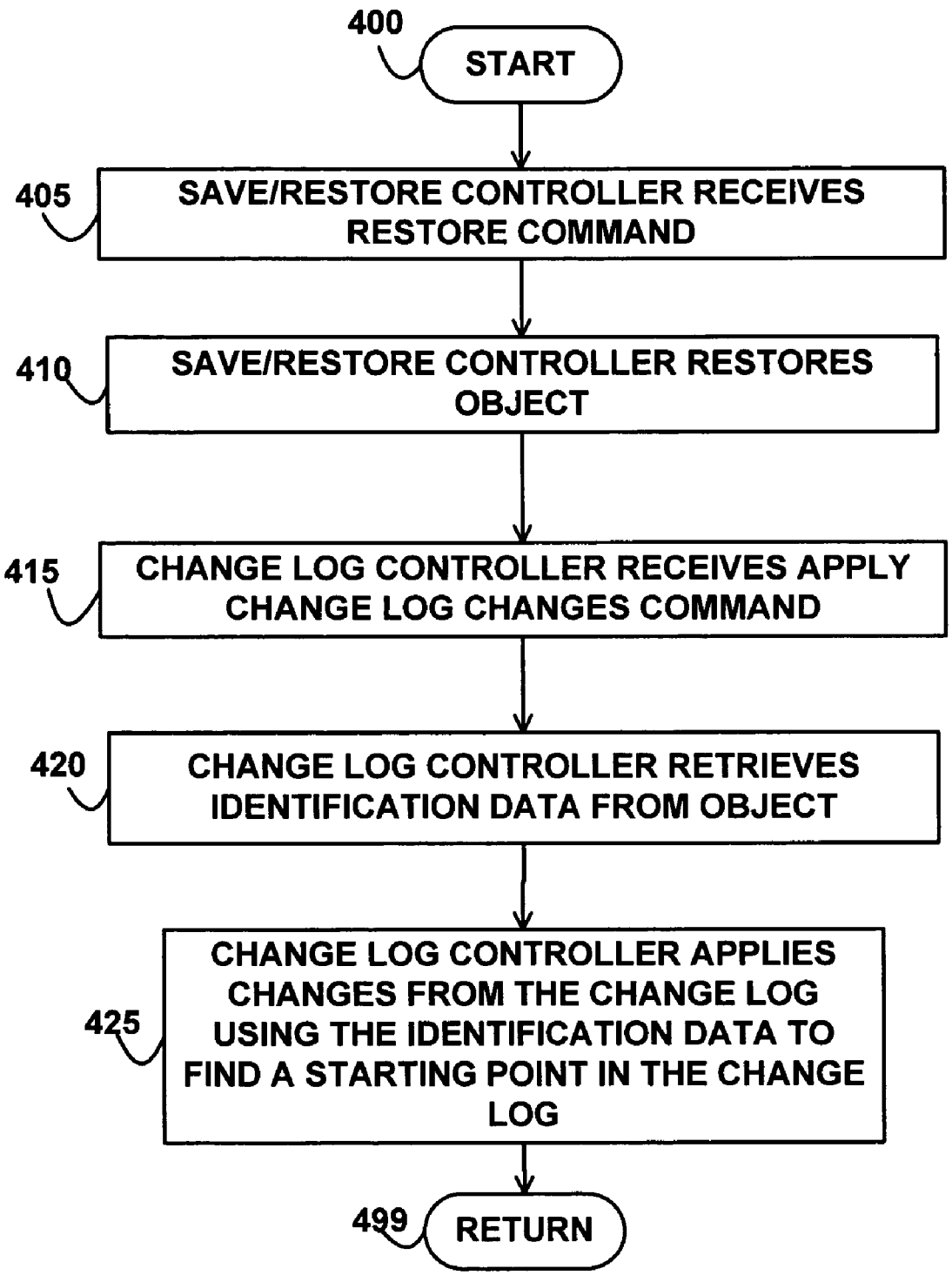
FIG. 4 depicts a flowchart of example processing of a restore command by a save/restore controller, according to an embodiment of the invention.

FIG. 4 depicts a flowchart of example processing of a restore command by the save/restore controller 146 and the change log controller 148, according to an embodiment of the invention. Control begins at block 400. Control then continues to block 405 where the save/restore controller 146 receives the restore command. The restore command may be issued by a system administrator, a user, or via a program.

Control then continues to block 410 where the save/restore controller 146 restores the object 142 from secondary storage, e.g., the tape 131 and stores the saved identification data in the change log entry identification data 280, if not already present. Control then continues to block 415 where the change log controller 148 receives an apply change log changes command. The apply change log changes command may be issued by a system administrator, a user, or via a program.

Control then continues to block 420 where the change log controller 148 retrieves the identification data from the change log entry identification 280 in the object 142. Control then continues to block 425 where the change log controller 148 applies changes from the change log 150 to the object 142 using the entry identified in the change log entry identification field 280 as the starting point. Control then continues to block 499 where the logic of FIG. 4 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
   depositing a save check-point entry to one of a plurality of entries in a change log, wherein each of the plurality of entries in the change log comprises a record identifier field, wherein the save check-point entry identifies a start of a save command for an object, wherein the object comprises a database, wherein the save command requests that the object be saved to non-volatile storage, wherein the change log is separate from the object, and wherein the record identifier field in the save check-point entry specifies that the save check-point entry is a checkpoint;
   logging changes to the object in the change log, wherein the logging is performed after the depositing the save check-point entry, wherein the logging further comprises saving, to other of the plurality of entries in the change log, an identifier of an operation that was performed to the object and data that the operation changed, wherein the record identifier field in the other of the plurality of entries identifies a respective record in the object associated with the respective other of the plurality of entries that was changed by the changes;
   saving the object to a saved version of the object in the non-volatile storage, wherein the saving the object is performed while the changes are performed to the object;
   storing into the saved version of the object an identification of the save check-point entry that identifies the start of the save command, wherein the save check-point entry comprises a starting point for applying the changes from the change log to the object;
   restoring the saved version of the object from the non-volatile storage;
   finding the save check-point entry based on the identification in the saved version of the object; and
   applying the changes from the change log to the object using the save check-point entry as a starting point after the restoring.

2. The method of claim 1, further comprising:
   depositing an end save check-point in the change log after saving the object to the non-volatile storage.

3. The method of claim 1, wherein the identification comprises a sequence number within the change log.

4. A method for configuring a computer, wherein the method comprises:
   configuring the computer to deposit a save check-point entry to one of a plurality of entries in a change log, wherein each of the plurality of entries in the change log comprises a record identifier field, wherein the save check-point entry identifies a start of a save command for an object, wherein the save command requests that the object be saved to non-volatile storage, wherein the non-volatile storage comprises a tape device, wherein the change log is separate from the object, and wherein the record identifier field in the save check-point entry specifies that the save check-point entry is a checkpoint;
   configuring the computer to log changes to the object in the change log, wherein the log of the changes is performed after the depositing the save check-point entry, wherein the configuring the computer to log further comprises configuring the computer to save, to other of the plurality of entries in the change log, an identifier of an operation that was performed to the object and data that the operation changed, wherein the record identifier field in the other of the plurality of entries identifies a respective record in the object associated with the respective other of the plurality of entries that was changed by the changes;
   configuring the computer to save the object to a saved version of the object in the non-volatile storage, wherein the save of the object is performed while the changes are performed to the object;
   configuring the computer to store into the saved version of the object an identification of the save check-point entry that identifies the start of the save command, wherein the save check-point entry comprises a starting point for applying the changes from the change log to the object;
   configuring the computer to restore the saved version of the object from the non-volatile storage;
   configuring the commuter to find the save check-point entry based on the identification in the saved version of the object; and
   configuring the computer to apply the changes from the change log to the object using the save check-point entry as a starting point after the restore.

5. The method of claim 4, further comprising:
   configuring the computer to deposit an end save check-point in the change log after saving the object to the non-volatile storage.

6. The method of claim 4, wherein the identification comprises a sequence number within the change log.

* * * * *